United States Patent
Kimpara et al.

(10) Patent No.: US 8,670,902 B2
(45) Date of Patent: Mar. 11, 2014

(54) ELECTRIC POWER STEERING APPARATUS

(75) Inventors: Yoshihiko Kimpara, Chiyoda-ku (JP);
Takayuki Kifuku, Chiyoda-ku (JP);
Masatsugu Nakano, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 516 days.

(21) Appl. No.: 12/947,490

(22) Filed: Nov. 16, 2010

(65) Prior Publication Data
US 2011/0264330 A1  Oct. 27, 2011

(30) Foreign Application Priority Data

Apr. 26, 2010  (JP) ................................ 2010-101346

(51) Int. Cl.
*G06F 19/00* (2011.01)
(52) U.S. Cl.
USPC ............................. 701/41; 180/443; 340/466
(58) Field of Classification Search
USPC .................. 324/503, 207.17; 701/42, 41, 36; 180/46, 443; 290/40 C; 318/139, 318/400.23; 123/399, 492; 388/803; 340/465, 466
See application file for complete search history.

(56) References Cited

U.S. PATENT DOCUMENTS

| | | | | |
|---|---|---|---|---|
| 6,326,750 | B1 * | 12/2001 | Marcinkiewicz | 318/432 |
| 7,042,227 | B2 * | 5/2006 | Mir et al. | 324/503 |
| 7,471,003 | B2 * | 12/2008 | Kobayashi et al. | 290/40 C |
| 2002/0105335 | A1 * | 8/2002 | Mir et al. | 324/503 |
| 2006/0176059 | A1 * | 8/2006 | Mir et al. | 324/503 |
| 2007/0093359 | A1 * | 4/2007 | Kobayashi et al. | 477/107 |

FOREIGN PATENT DOCUMENTS

| | | |
|---|---|---|
| JP | 61-1 84171 A | 8/1986 |
| JP | 01-186468 A | 7/1989 |
| JP | 08-295257 | 11/1996 |
| JP | 2000-279000 A | 10/2000 |
| JP | 2005-289296 A | 10/2005 |
| JP | 2007-116849 A | 5/2007 |
| JP | 2007-325408 A | 12/2007 |
| JP | 2008-006919 A | 1/2008 |
| JP | 2008-105652 A | 5/2008 |
| JP | 2008-271755 A | 11/2008 |

OTHER PUBLICATIONS

German Office Action, issued Jul. 15, 2013, Patent Application No. 10 2010 043 297.0.

* cited by examiner

*Primary Examiner* — Ronnie Mancho
(74) *Attorney, Agent, or Firm* — Sughrue Mion, PLLC; Richard Turner

(57) ABSTRACT

An electric power steering apparatus includes an rotating AC machine which generates an auxiliary torque for assisting a steering torque of a steering system; and a controller which performs control so that the allowed electric current amplitude of the rotating AC machine becomes large if a rotational speed of the rotating AC machine is increased. Accordingly, it is possible to release or lessen the limit on the number of repetitions or continuous time of the "stationary steering" or the "end contact".

8 Claims, 10 Drawing Sheets

ELECTRIC POWER STEERING APPARATUS ACCORDING TO THE PRESENT EMBODIMENT

ELECTRIC POWER STEERING APPARATUS IN THE RELATED ART

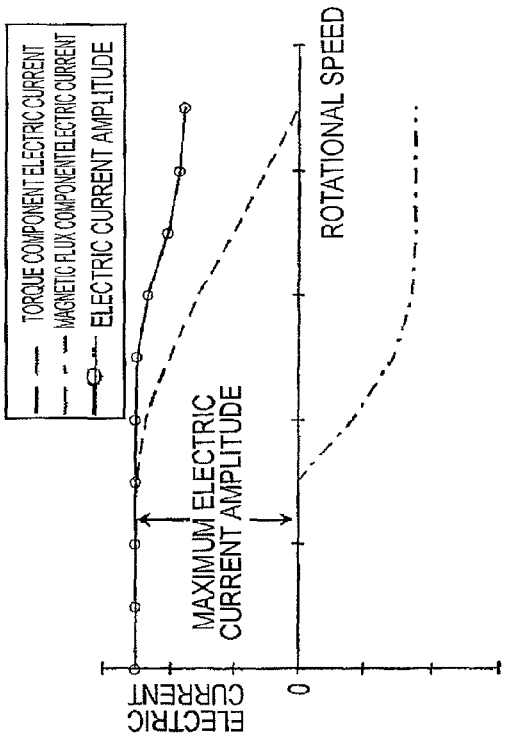
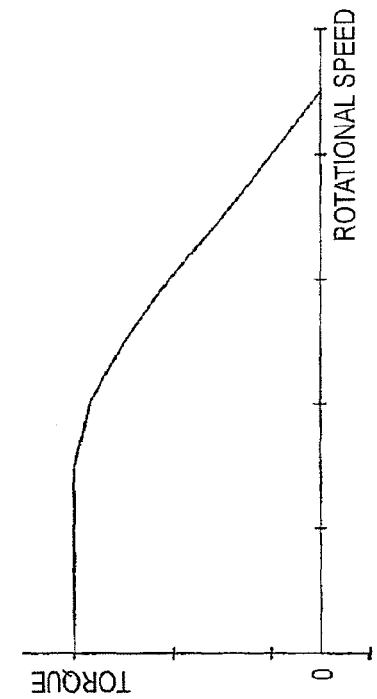
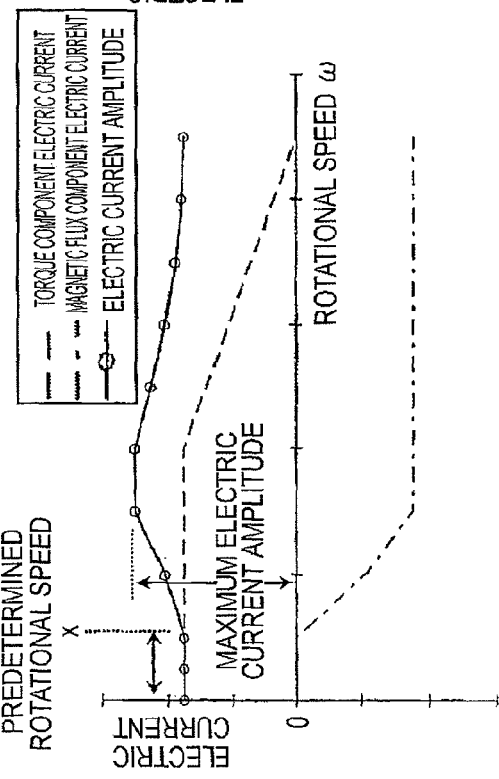
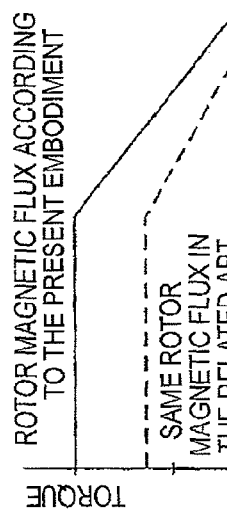

ELECTRIC POWER STEERING APPARATUS

FIELD OF THE INVENTION

The present invention relates to an electric power steering apparatus which generates an auxiliary torque for a steering torque of a steering system using an rotating AC machine.

DESCRIPTION OF THE RELATED ART

There is known an electric power steering apparatus which performs power supply from a semiconductor power converter so as to detect a steering torque of a steering system and to generate an auxiliary torque by an rotating AC machine on the basis of the detected torque.

In general, in a case where the rotating AC machine is driven by the semiconductor power converter provided in the electric power steering apparatus, an alternating current is decomposed into a magnetic flux component electric current and a torque component electric current by means of a technique which is called coordinate transformation, and the torque component electric current is controlled to become a desired value. Thus, it is possible to set torque of the rotating AC machine at a desired auxiliary torque. Further, in a case where an rotating AC machine having a permanent magnet in a rotor is used, since an induced voltage reaches a voltage amplitude which can be applied to the rotating AC machine if the magnitude of a rotational speed is increased, a flux weakening control for controlling the magnetic flux component current is performed so as to cancel the magnetic flux of the rotor, thereby restricting the increase in the induced voltage to drive the rotating AC machine up to a high speed rotation.

However, in an rotating AC machine for driving a fan pump, since load may be proportional to a rotational speed or the square of the rotational speed, as the rotational speed is increased, the load becomes large. Thus, in the rotating AC machine for driving the fan pump or the like, as the rotational speed is increased, it is required to increase the electric current amplitude of the rotating AC machine.

On the other hand, in the rotating AC machine provided in the electric power steering apparatus, as the rotational speed is decreased, the load becomes large, unlike the rotating AC machine for driving the fan pump or the like. Specifically, in steering of the steering apparatus, a large amount of auxiliary torque is required when the steering is performed in a state where the vehicle is stopped, which is called "stationary steering". Since the steering speed of the "stationary steering" is not high, the rotational speed of the rotating AC machine which generates the auxiliary torque is also not high. In this way, since the load becomes high as the rotational speed is decreased in the rotating AC machine provided in the electric power steering apparatus, the electric current amplitude of the rotating AC machine has been made large as the rotational speed is decreased in the electric power steering apparatus in the related art.

In a case where the "stationary steering" is performed, since the rotational speed of the rotating AC machine is not high, the rotating AC machine provided in the electric power steering apparatus does not need the flux weakening control. Accordingly, in a case where the rotating AC machine generates the maximum torque which can be output, if the driving is performed with a magnetic flux component electric current instruction being zero and with an electric current component being equivalent to a torque component electric current, this is suitable for generating a large amount of auxiliary torque in the "stationary steering". Further, in a case where a large amount of auxiliary torque is generated in the rotating AC machine, the semiconductor power converter provided in the electric power steering apparatus supplies a large amplitude electric current to the rotating AC machine. As the electric current amplitude which can be supplied by the semiconductor power converter becomes large, the cost or size of the semiconductor power converter is increased. Thus, in order to prevent unnecessary use of the semiconductor power converter, it may be advantageous to generate the maximum electric current which can be supplied by the semiconductor power converter in a region where the rotational speed generated by the "stationary steering" is low.

For example, in an electric power steering apparatus in the related art which is disclosed in JP-A-2000-279000 (refer to paragraph 0007 and FIG. 5), when the rotating AC machine is controlled according to a torque instruction by means of a vector control which can be expressed by a two-phase rotating coordinate system in which a direction of a magnetic flux component electric current is represented as a d-axial direction and a direction perpendicular to the d-axis is represented as a q-axial direction, as a d-axis electric current, which is a d-axis component of an armature current of the rotating AC machine in a state where the torque instruction is zero, is corrected into a predetermined value in which the magnetic flux of the rotating AC machine is weakened, and as the predetermined value is corrected so that the d-axis electric current becomes zero in a case where the torque instruction is increased from the zero state, the d-axis electric current is normally set so that the magnetic flux of the rotating AC machine is weakened in the state where the torque instruction is zero, and in this state, the predetermined value is corrected so that the d-axis electric current becomes zero in the case where the torque instruction is increased from the zero state, and thus, the control for weakening the magnetic flux of the rotating AC machine is released.

Further, for example, in an electric power steering apparatus in the related art which is disclosed in JP-A-2007-116849 (refer to paragraph 0039 and FIG. 2), at the time of a d-axis flux weakening control of a vector control, when an electric current instruction value or the rotation number is slightly changed, the change in a d-axis electric current instruction value is restricted so that an output torque is not changed, and thus, a torque ripple in a high speed region of the rotating AC machine is prevented from being generated even at the time of rapid K-turn steering of a steering wheel, and the driving of the rotating AC machine is realized without any vibration or abnormal sound. Here, the d-axis electric current instruction value is calculated by a d/q-axes electric current instruction value arithmetic unit having a flux weakening control d/q-axes electric current relation curve, and the d-axis electric current instruction value becomes zero when a q-axis electric current instruction value is the maximum.

Further, for example, in an electric power steering apparatus in the related art which is disclosed in JP-A-2008-6919 (refer to paragraph 0021 and FIGS. 4 to 6), an electronic control unit includes a flux weakening control parameter arithmetic unit relating to a flux weakening control for efficiency, miniaturization and high output of the rotating AC machine. The flux weakening control parameter arithmetic unit receives inputs of an angular speed $\omega$ of the rotating AC machine, a q-axis instruction voltage $Vq^{*\prime}$ with respect to the rotating AC machine and a q-axis real electric current Iq of the rotating AC machine, and calculates first to third parameters Cw, Cq and Ci according to the angular speed $\omega$, the q-axis instruction voltage $Vq^{*\prime}$ and the q-axis real electric current Iq by referring to a first to third parameter table.

The first to third parameters Cw, Cq and Ci are supplied to a d-axis target electric current arithmetic unit, and the d-axis target electric current arithmetic unit multiplies the first to third parameters Cw, Cq and Ci by a positive coefficient k, to thereby calculate a d-axis target electric current Id* (=k·Cw·Cq·Ci). The d-axis target electric current Id* is a d-axis component electric current in the vector control expressed by the two-phase rotating magnetic flux coordinate system, which weakens the magnetic flux of the rotating AC machine. Here, since the third parameter Ci which is a coefficient of the q-axis real electric current becomes zero when the q-axis real electric current is the maximum, the d-axis target electric current becomes zero in a case where the maximum torque is output.

Further, for example, in an electric power steering apparatus in the related art which is disclosed in JP-A-2008-271755 (refer to paragraph 0006 and FIGS. 1 and 2), in order to control an output voltage instruction value of a power converter which drives a permanent magnet rotating AC machine on the basis of electric current instruction values of a d-axis and a q-axis, electric current detection values of the d-axis and the q-axis, and frequency calculation values thereof, in a case where a torque instruction value exceeding torque which can be output in a range where voltage is not saturated is input, a limit value of a phase angle which is a difference between a rotating phase instruction value of the control and a rotating phase value of the rotating AC machine can be changed on the basis of a predetermined state amount, and thus, a limit torque is output so that the rotating AC machine can be stably driven even in a case where a torque instruction value excessively larger than torque which can be output at the time of the flux weakening control is input. Here, the d-axis electric current instruction is fixed to zero, and the d-axis electric current instruction is zero in a case where the rotating AC machine generates the maximum torque which can be output.

As described above, in the electric power steering apparatuses in the related art, in the case where the rotating AC machine generates the maximum torque which can be output, the magnetic flux component electric current is set to zero. Thus, when the "stationary steering" is performed, the maximum electric current which can be supplied by the semiconductor power converter is all allocated to the torque component electric current.

Further, in a case where a steering in which a steering angle reaches the maximum, which is called "end contact", is performed, since a steering power applied to the steering becomes large, the semiconductor power converter supplies a large amount of electric current to the rotating AC machine in a region where the rotation speed is low in a similar way to the case of the "stationary steering". However, if the "end contact" continuously occurs, the amount of heat generation is increased as will be described later, and thus, there is a risk of affecting the reliability. Thus, the electric power steering apparatuses in the related art are configured so that an allowable value of the electric current amplitude to be supplied is changed when the electric current continues to flow for a predetermined time or more, or are configured to include a steering angle determination means for determining that the steering angle becomes an angle immediately before a predetermined value from the end contact angle.

For example, in an electric power steering apparatus in the related art which is disclosed in JP-A-01-186468 (refer to claim 1), there is provided a rotating machine limiting means for limiting a maximum value of a rotating machine electric current according to the magnitude of an average value of electric current of a rotating machine when electric current continues to flow for a predetermined time or more in the rotating machine, and thus, heat generation due to the continuous generation of a large amount of electric current is prevented.

Further, for example, in an electric power steering apparatus in the related art which is disclosed in JP-A-61-184171 (refer to claim 1 and FIG. 1), there is provided a steering angle determination means for determining that a steering angle of a steering system becomes an angle immediately before a predetermined value from the end contact angle, and electric power supplied to a rotating machine when the steering angle becomes the angle immediately before the predetermined value from the end contact angle is decreased to thereby decrease an auxiliary torque.

In addition, for example, in an electric power steering apparatus in the related art which is disclosed in JP-A-2005-289296 (refer to paragraph 0006 and FIG. 5), any three-phase electric current flowing in a three-phase inverter is controlled to be smaller than a maximum electric current value in a end contact angle at the time of steering, and thus, the three-phase inverter reduces its heat generation at the time of the end contact angle.

The loss in a semiconductor power converter and an rotating AC machine generated when electric power is supplied to the rotating AC machine is proportional to the square of electric current amplitude. Accordingly, in a case where the rotating AC machine generates a large amount of auxiliary torque by the "stationary steering" or the "end contact", the loss due to the electric power supply becomes remarkably large.

In the electric power steering apparatuses in the related art which are disclosed in the above-mentioned JP-A-2000-279000, JP-A-2007-116849, JP-A-2008-6919 and JP-A-2008-271755, in the case where the "stationary steering" or the "end contact" is performed, the electric current which can be supplied by the semiconductor power converter is all allocated to the torque component electric current. Thus, if the "stationary steering" or the "end contact" generated in a range where the rotational speed is low is performed, the electric current which can be supplied by the semiconductor power converter becomes the maximum electric current and heat generation also becomes large, to thereby place a limit on the number of repetitions of the "stationary steering" or the continuous time of the "end contact", which results in the problem that the steering feeling is deteriorated.

Further, in the electric power steering apparatus in the related art which is disclosed in the above-mentioned JP-A-01-186468, since the electric current does not continuously flow for a predetermined time or more so as to restrict heat generation in an allowable range, the number of repetitions of the "stationary steering" or the continuous time of the "end contact" is limited, thereby resulting in the problem that the steering feeling is deteriorated in a similar way.

In addition, in the electric power steering apparatus in the related art which is disclosed in the above-mentioned JP-A-61-184171 or JP-A-2005-289296, since it is determined that the steering angle becomes the angle immediately before the predetermined value from the end contact angle, the heat generation due to the "end contact" can be restricted. However, since the steering angle of the "stationary steering" becomes arbitrary, there is a problem that the heat generation due to the "stationary steering" cannot be restricted. Further, such an electric power steering apparatus in the related art needs to include the steering angle determination means, but only a relative value of the steering angle can be determined from information about the rotational position of the rotating AC machine. Thus, in order to determine an absolute value of the steering angle, a steering angle detector or the like is required, which causes a problem that the cost of the electric power steering apparatus is increased.

SUMMARY OF THE INVENTION

The present invention has been made to solve the above problems, and provides an electric power steering apparatus which is capable of releasing or lessening the limit on the number of repetitions or continuous time of the "stationary steering" or the "end contact".

According to an aspect of the present invention, there is provided an electric power steering apparatus including: an rotating AC machine which generates an auxiliary torque for assisting a steering torque of a steering system; and a controller which performs control so that the allowed electric current amplitude of the rotating AC machine becomes large if a rotational speed of the rotating AC machine is increased.

With such a configuration, in a case where the rotational speed is higher than a predetermined value, since it is not necessary to continue or repeat a large amount of auxiliary torque, even though the electric current amplitude is allowed up to the maximum electric current amplitude which can be supplied by a semiconductor power converter at a predetermined rotational speed or above, the number of repetitions or continuous time of the "stationary steering" or the "end contact" is not reduced, and the allowed electric current amplitude becomes smaller than the maximum electric current amplitude which can be supplied by the semiconductor power converter at the predetermined rotational speed or below (low speed region). Thus, it is possible to release or lessen the limit on the number of repetitions or continuous time of the "stationary steering" or the "end contact".

The foregoing and other objects, features, aspects, and advantages of the present invention will become apparent from the following detailed description of the present invention when taken in conjunction with the accompanying drawings.

BRIEF DESCRIPTION OF THE DRAWINGS

FIGS. 10A and 10B are diagrams illustrating electric current amplitude allowed according to a rotational speed and a maximum torque which can be generated by an rotating AC machine.

DETAILED DESCRIPTION OF THE INVENTION

First Embodiment

Figure 1:
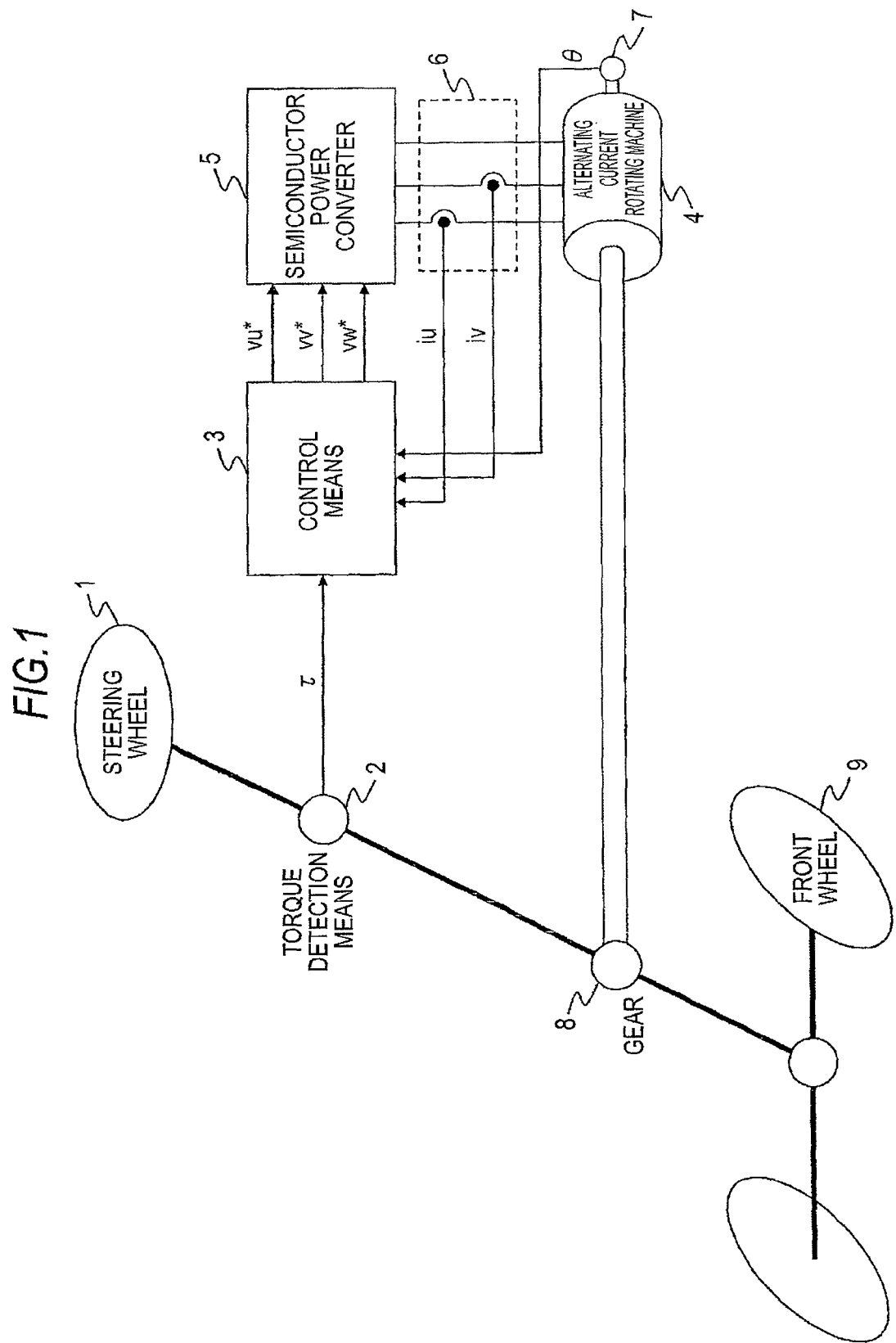
FIG. 1 is a diagram illustrating a configuration of an electric power steering apparatus according to a first embodiment of the present invention.

FIG. 1 is a diagram illustrating a configuration of an electric power steering apparatus according to a first embodiment of the invention. If an operator generates a steering torque of a steering system by a steering wheel 1, a torque detection means 2 detects the steering torque and outputs the detected steering torque as a detection torque $\tau$. In order to generate a torque which assists the steering torque in an rotating AC machine 4, a control means 3 calculates three-phase voltage references vu*, vv* and vw* to be applied to the rotating AC machine 4 on the basis of the detection torque $\tau$ obtained from the torque detection means 2, to thereby output the calculation result to a semiconductor power converter 5. In this embodiment, a case where a surface permanent magnet synchronous machine called a DC brushless motor is used as the rotating AC machine 4 is described. However, another rotating AC machine such as an interior permanent magnet synchronous machine called an IPM motor may be used as the rotating AC machine 4 instead.

The semiconductor power converter 5 applies three-phase voltages vu, vv and vw to the rotating AC machine 4, on the basis of the voltage instructions obtained from the control means 3. An electric current detector 6 detects three-phase electric currents which are supplied to the alternating current rotation machine 4 by the semiconductor power converter 5, and outputs the detection result to the control means 3. According to the present embodiment, the electric current detector 6 detects two-phase electric currents iu and iv among the three-phase electric currents, but may detect three-phase electric currents iu, iv and iw. Further, a known technique in which the three-phase electric currents are obtained by a calculation from a bus current (not shown) inside of the semiconductor power converter 5 may be used.

A rotational position detector 7 detects a rotational position $\theta$ of the rotating AC machine 4, and outputs the detection result to the control means 3. In the present embodiment, the rotational position detector 7 directly detects the rotational position with a resolver or the like, but the rotational position may be obtained by a known technique which calculates the rotational position on the basis of the voltage applied to the rotating AC machine 4 and the electric current detected by the electric current detector 6. The rotating AC machine 4 generates an auxiliary torque for assisting the steering torque through a gear 8, and front wheels 9 are steered by the steering torque and the auxiliary torque.

Figure 2:
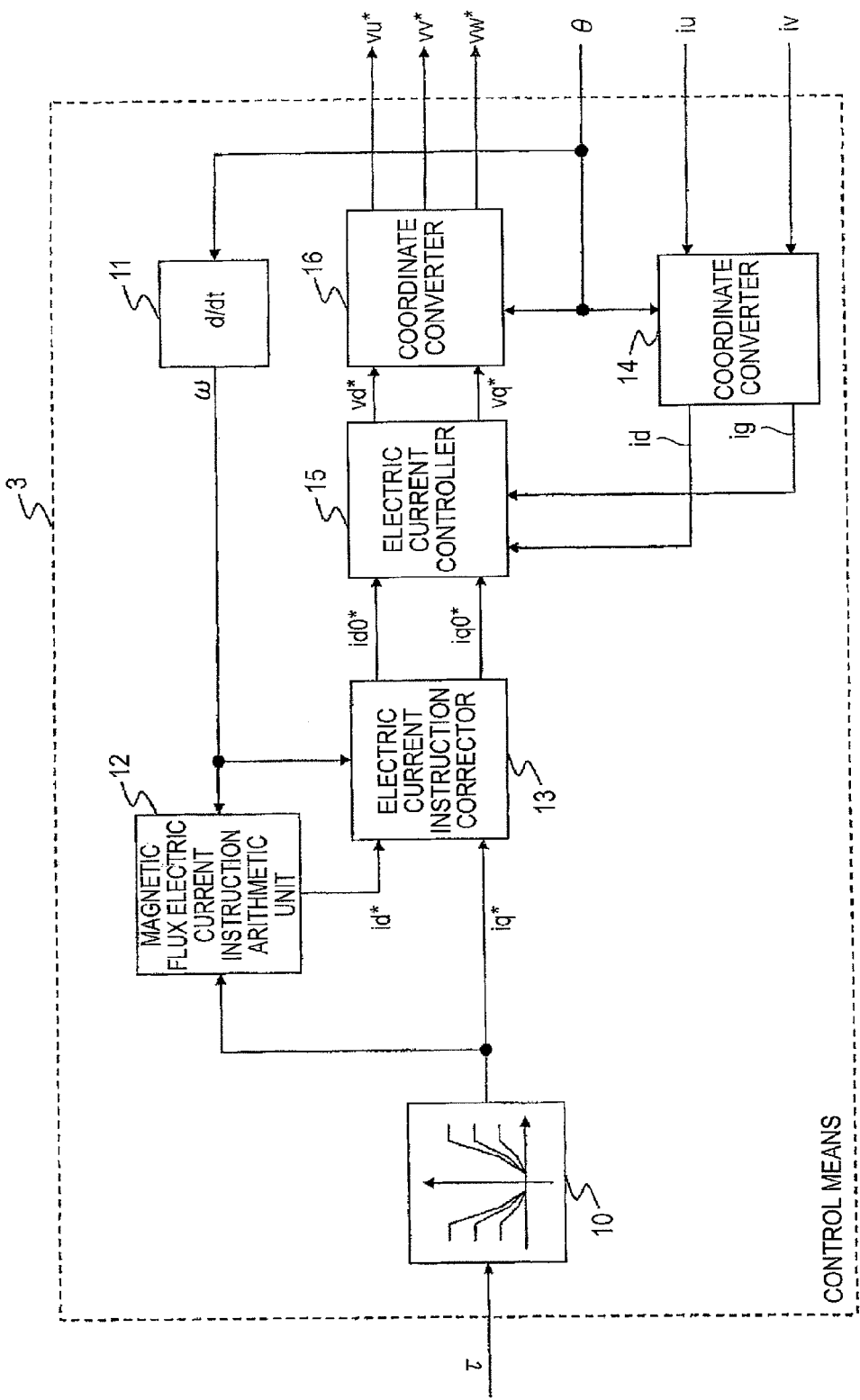
FIG. 2 is a diagram illustrating an internal configuration of a control means according to the first embodiment.

FIG. 2 is a diagram illustrating an internal configuration of the control means 3 according to the first embodiment of the invention. In the figure, a torque component electric current instruction arithmetic unit 10 outputs a torque component electric current instruction iq* on the basis of the detection torque $\tau$ obtained from the torque detection means 2. As known in the related art, the torque component electric current instruction arithmetic unit 10 may output the torque component electric current instruction iq*, on the basis of the detection torque $\tau$ and information such as a vehicle speed (not shown) other than the detection torque.

A rotational position change rate arithmetic unit 11 calculates a change rate of the rotational position $\theta$ obtained from the rotational position detector 7, and outputs the calculated change rate as a rotational speed $\omega$ of the rotating AC machine 4. A magnetic flux component electric current instruction arithmetic unit 12 outputs a magnetic flux component electric current instruction id* on the basis of the rotational speed ω and the torque component electric current instruction iq*. Further, as known in the related art, the magnetic flux component electric current instruction 12 may output the magnetic flux component electric current instruction id* on the basis of a plurality of pieces of information such as a bus voltage (not shown) inside the semiconductor power converter, in addition to the rotational speed ω and the torque component electric current instruction iq*.

As described above, since if the rotational speed of the rotating AC machine 4 is increased, an inductive voltage reaches a voltage amplitude which can be applied to the rotating AC machine 4, the magnetic flux component electric current instruction id* output by the magnetic flux component electric current instruction arithmetic unit 12 is set to a value for canceling the magnetic flux of a rotor, as the rotational speed is increased. Through this operation, even if the rotational speed is increased, since the inductive voltage can be restricted from being increased, the rotating AC machine 4 can be driven at a high rotation. Further, in a case where the inductive voltage is sufficiently smaller than the voltage amplitude which can be applied to the rotating AC machine, the magnetic flux component electric current instruction id* is set to zero so that an unnecessary electric current is not supplied thereto.

The electric current amplitude of the rotating AC machine 4 is proportional to the square-root of the sum of the squares of the magnetic flux component electric current and the torque component electric current. Here, if the relationship between the magnetic flux component electric current instruction id* and the torque component electric current instruction iq* is a relationship in which the electric current amplitude supplied to the rotating AC machine 4 is within an allowable range, an electric current instruction corrector 13 outputs the magnetic flux component electric current instruction id* as a corrected magnetic flux component electric current instruction id0* as it is, and outputs the torque component electric current instruction iq* as a corrected torque component electric current instruction iq0* as it is.

On the other hand, if the relationship between the magnetic flux component electric current instruction id* and the torque component electric current instruction iq* is a relationship in which the electric current amplitude supplied to the rotating AC machine 4 exceeds the allowable range, the electric current instruction corrector 13 corrects the magnetic flux component electric current instruction id* or the torque component electric current instruction iq*, or both of the magnetic flux component electric current instruction id* and the torque component electric current instruction iq* to output the corrected magnetic flux component electric current instruction id0* and the corrected torque component electric current instruction iq0*, so that the electric current amplitude is within the allowable range.

In this way, the electric current instruction corrector 13 is operated so that the allowed electric current amplitude becomes large if the rotational speed ω (change rate of the rotational position) is increased, and the allowed electric current amplitude becomes small if the rotational speed ω is decreased.

A coordinate converter 14 outputs the magnetic flux component electric current id and the torque component electric current iq, on the basis of the three-phase electric currents iu and iv obtained from the electric current detector 6 and the rotational position θ obtained from the rotational position detector 7. An electric current controller 15 outputs a magnetic flux component voltage instruction vd* and a torque component voltage instruction vq* so that the magnetic flux component electric current id coincides with the corrected magnetic flux component electric current instruction id0, and the torque component electric current iq coincides with the corrected torque component electric current instruction iq0*. A coordinate converter 16 outputs three-phase voltage references vu*, vv* and vw* on the basis of the magnetic flux component voltage instruction vd*, the torque component voltage instruction vq* and the rotational position θ. As the control means 3 employs the configuration in FIG. 2, the electric current of the rotating AC machine 4 is decomposed into the magnetic flux component electric current id and the torque component electric current iq, and thus, the magnetic flux component electric current id and the torque component electric current iq can be independently controlled.

Figure 3:
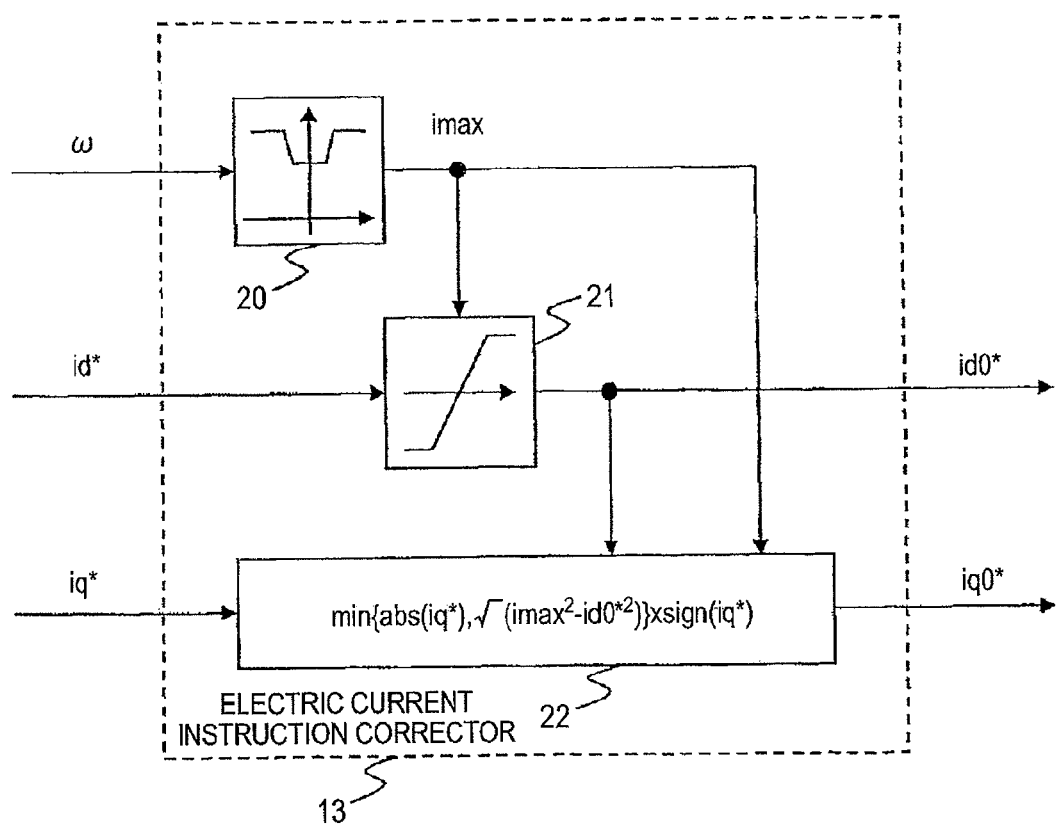
FIG. 3 is a diagram illustrating an internal configuration of an electric current instruction corrector according to the first embodiment.

FIG. 3 is a diagram illustrating an internal configuration of the electric current instruction corrector 13 according to the first embodiment of the invention. In the figure, an allowable electric current arithmetic unit 20 outputs an allowable electric current amplitude imax on the basis of the rotational speed ω. The allowable electric current arithmetic unit 20 outputs the allowable electric current amplitude imax so that the allowable electric current amplitude imax becomes large if the rotational speed ω is increased. The corrected magnetic flux component electric current instruction arithmetic unit 21 sets the corrected magnetic flux component electric current instruction id0* to −imax in a case where the magnetic flux component electric current instruction id* is smaller than −imax, sets the corrected magnetic flux component electric current instruction id0* to imax in a case where the magnetic flux component electric current instruction id* is larger than imax, and sets the corrected magnetic flux component electric current instruction id0* to the magnetic flux component electric current instruction id* in other cases.

Further, a corrected torque component electric current instruction arithmetic unit 22 calculates the corrected torque component electric current instruction iq0* according to the following formula (1).

$$Iq0^* = \min\{abs(iq^*), \sqrt{(imax^2 - id0^{*2})}\} \times sign(iq^*) \tag{1}$$

Here, the formula (1) will be described. Firstly, an absolute value abs(iq*) of the torque component electric current instruction iq* is calculated. As described above, since the electric current amplitude of the rotating AC machine 4 is proportional to the square-root of the sum of the squares of the magnetic flux component electric current and the torque component electric current, $id0^{*2} + iq0^{*2}$ can be allowed up to $imax^2$. In other words, the magnitude of iq0* can be allowed up to $\sqrt{(imax^2 - id0^{*2})}$. Thus, in consideration of a minimum relationship between abs(iq*) and $\sqrt{(imax^2 - id0^{*2})}$, a smaller value "min{abs(iq*), $\sqrt{(imax^2 - id0^{*2})}$}" among the abs(iq*) and $\sqrt{(imax^2 - id0^{*2})}$ is calculated. In a case where the $id0^{*2} + iq^{*2}$ is smaller than $imax^2$, since min{abs(iq*), $\sqrt{(imax^2 - id0^{*2})}$} becomes abs(iq*), iq0*, that is, min{abs(iq*), $\sqrt{(imax^2 - id0^{*2})}$}×sign(iq*) becomes abs(iq*)×sign(iq*), that is, iq*.

Further, in a case where $id0^{*2} + iq^{*2}$ is larger than $imax^2$, since min{abs(iq*), $\sqrt{(imax^2 - id0^{*2})}$} becomes $\sqrt{(imax^2 - id0^{*2})}$, min{abs(iq*), $\sqrt{(imax^2 - id0^{*2})}$}×sign(iq*) becomes $\sqrt{(imax^2 - id0^{*2})}$×sign(iq*), and iq0* is set to $\sqrt{(imax^2 - id0^{*2})}$×sign(iq*). At this time, the square-root $\sqrt{(id0^{*2} + iq0^{*2})}$ of the sum of the squares of the corrected magnetic flux component electric current instruction id0* and the corrected torque component electric current instruction iq0* output by the electric current instruction corrector 13 coincides with imax. As the corrected torque component electric current instruction arithmetic unit 22 performs such a calculation, $\sqrt{(id0^{*2}+iq0^{*2})}$ corresponding to the instruction value of the electric current amplitude of the rotating AC machine can be allowed up to imax.

With such a configuration, as the rotational speed ω of the rotating AC machine 4 is increased, the allowable electric current amplitude imax becomes large. In the electric power steering, in a case where the rotational speed is higher than a predetermined value, an auxiliary torque which is continuously or repeatedly generated is small. In other words, in a case where the rotational speed is higher than the predetermined value, since a large amount of auxiliary torque is not continuously or repeatedly generated, in this case, even though the semiconductor power converter allows the electric current amplitude up to the maximum electric current amplitude which can be supplied by the semiconductor power converter, the heat generation of the semiconductor power converter does not continuously occur, and the steering feeling is not deteriorated.

On the other hand, in a case where the rotational speed is lower than the predetermined value, the "stationary steering" or the "end contact" requiring a large amount of auxiliary torque as described above may occur, and the "stationary steering" or the "end contact" may be repeated or may be continuously operated.

Figure 4:
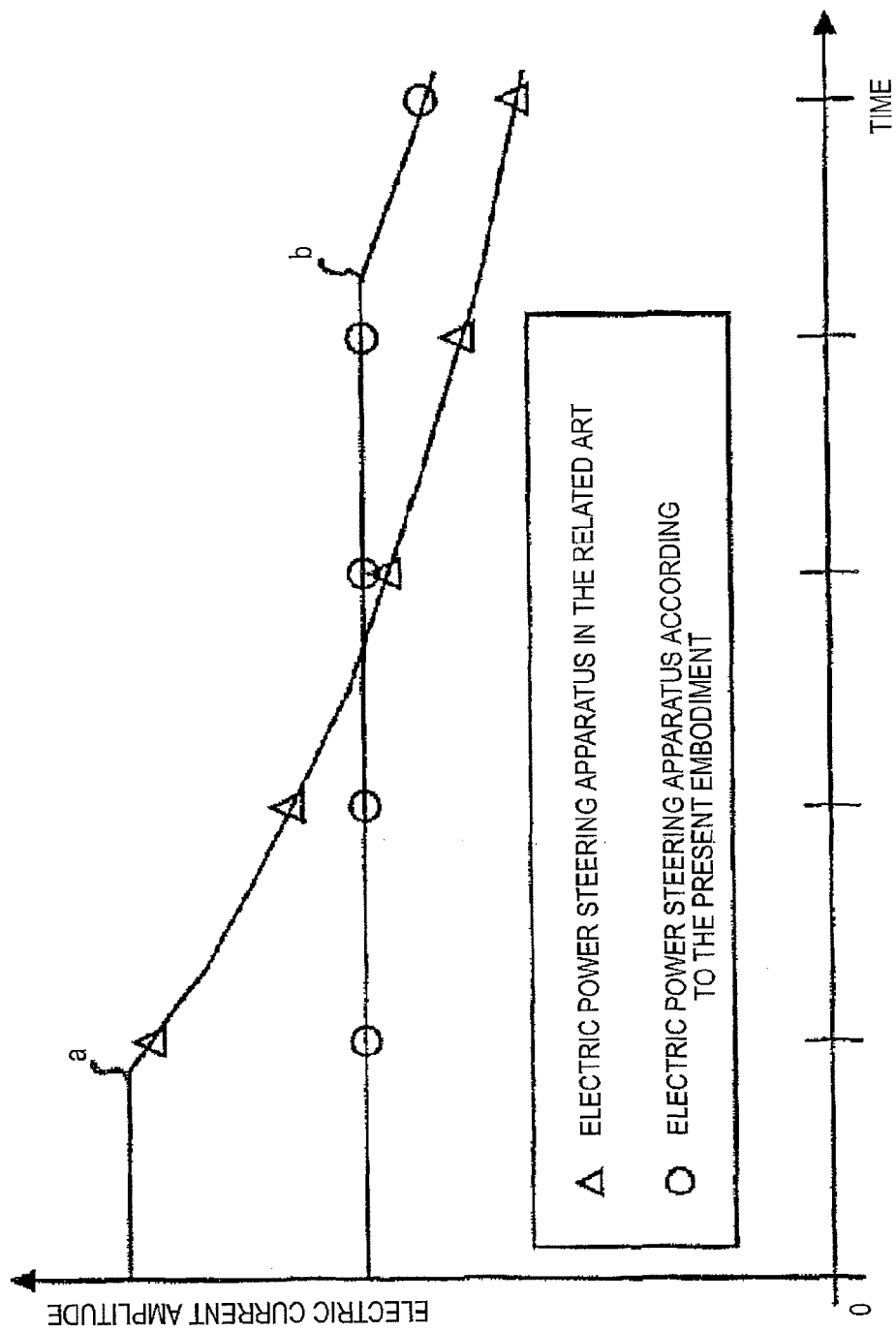
FIG. 4 is a diagram illustrating a relationship between a point of time and electric current amplitude in a case where a "end contact" is continuously performed.

FIG. 4 illustrates the relationships between points of time and electric current amplitudes of an electric power steering apparatus in the related art (indicated as Δ in the figure) and the electric power steering apparatus according to the present embodiment (indicated as O in the figure) in a case where the "end contact" is continuously performed. Since a steering angle of the "end contact" reaches the maximum, the rotational speed is zero.

In the electric power steering apparatus in the related art, since the electric current amplitude may become the maximum during the "end contact", when the electric current continuously flows for a predetermined time or more, the maximum value of the electric current is restricted (reduced from a point "a") according to the magnitude of the average value of the electric current, and thus, the heat generation due to continuous generation of a large amount of electric current is prevented, but as the electric current amplitude is changed, the steering feeling is deteriorated.

On the other hand, in the electric power steering apparatus according to the present embodiment, since the allowed electric current amplitude becomes large (reduced from a point "b") if the rotational speed is increased, the electric current amplitude which is smaller than in the electric power steering apparatus in the related art is supplied at the time of the "end contact" when the rotational speed is zero, and thus, the power supply capability of the semiconductor power converter cannot be used at the maximum level. However, instead, even if the "end contact" is continuously performed, since the power supply capability of the semiconductor power converter is not at the maximum level, the heat generation of the semiconductor power converter can be restricted.

Since the loss generated in the semiconductor power converter is proportional to the square of the electric current amplitude, the loss is decreased by 50% if the electric current amplitude is decreased by 30%, and the loss can be reduced by 20% by decreasing the electric current amplitude by only 10%. In this way, the heat generation generated in the semiconductor power converter can be effectively reduced by slightly decreasing the electric current amplitude for the power supply capability of the semiconductor power converter.

Further, in a case where the "end contact" shown in FIG. 4 is continuously performed, a point of time (point "b") when the restriction of the electric current amplitude due to the heat generation of the semiconductor power converter starts becomes delayed by four times or more compared with the electric power steering apparatus (point "a") in the related art. Since the point of time when the restriction of the electric current amplitude starts is delayed in this way, an opportunity for the "end contact" in which the restriction of the electric current amplitude starts is decreased. As a result, the problem that the feeling is deteriorated can be solved or lessened.

The case of the "end contact" is described with reference to FIG. 4. However, since the "stationary steering" is similarly generated under a condition that the rotational speed is low, the same effects can be achieved.

As described above, in the electric power steering apparatus in the related art, since the operation such as a "stationary steering" or "end contact" required for a large amount of auxiliary torque is generated in a region in which the rotational speed is low, in a case where the rotational speed is in this region, the allowed electric current amplitude is set so that the power supply capability of the semiconductor power converter is utilized as effectively as possible. Thus, it is difficult to solve the problem that the feeling is deteriorated if the "stationary steering" or "end contact" is continuously or repeatedly generated.

On the other hand, in the electric power steering apparatus according to the present embodiment, if the rotational speed of the rotating AC machine is increased, since the allowed electric current amplitude becomes large, in the region in which the rotational speed is low, the power supply capability of the semiconductor power converter cannot be fully utilized. However, instead, even in a case where the "stationary steering" or "end contact" is continuously or repeatedly generated, the problem that the feeling is deteriorated can be solved or lessened, unlike the electric power steering apparatus in the related art.

Further, in the electric power steering apparatus in the related art which includes the steering angle determination means for determining that the steering angle becomes an angle immediately before a predetermined value from the end contact angle, the steering angle detector is required, and further, there is no effect against the heat generation due to the continuous or repeated generation of the "stationary steering". However, in the electric power steering apparatus according to this embodiment, the steering angle detector is not required, and further, the heat generation due to the continuous or repeated generation of any one of the "stationary steering" and "end contact" can be restricted.

Further, when the case where the surface permanent magnet synchronous machine is used as the rotating AC machine 4 is compared with the case where the interior permanent magnet synchronous machine is used as the rotating AC machine 4, the case of the surface permanent magnet synchronous machine is more advantageous in that torque which can be output in a region of a high rotational speed is large.

In general, since the interior permanent magnet synchronous machine has high inductance and can make the weakened magnetic flux generated by the magnetic flux component electric current and the inductance be increased, the interior permanent magnet synchronous machine can be driven up to a high rotational speed in a case where the torque is small. However, in a case where the torque is large, an armature reaction generated by the torque component electric current and the inductance is significant, and voltage saturation is likely to occur. In other words, in the surface permanent magnet synchronous machine, in a case where the torque is large, since the armature reaction generated by the torque component electric current and the inductance is not significant, and the voltage saturation does not easily occur, the torque which can be output in the region of the high rotational speed is large.

Accordingly, as disclosed in the present embodiment, in the controller which performs control so that the electric current amplitude allowed by the rotating AC machine becomes large if the rotational speed is increased, by providing the rotating AC machine as the surface permanent magnet synchronous machine, the torque which can be output in the region of the high rotational speed can be secured in addition to the above described effects. Thus, it is possible to achieve the electric power steering apparatus which can perform the "stationary steering" up to a higher steering speed.

Further, in the electric power steering apparatus, torque ripples of the rotating AC machine appear as fine vibrations of a steering wheel. When the case where the surface permanent magnet synchronous machine is used as the rotating AC machine 4 is compared with the case where the interior permanent magnet synchronous machine is used as the rotating AC machine 4, the case of the surface permanent magnet synchronous machine is advantageous in that the torque ripples are small. Accordingly, as the rotating AC machine is provided as the surface permanent magnet synchronous machine, an electric power steering apparatus in which the fine vibrations of the steering wheel are small can be obtained in addition to the above described effects.

Second Embodiment

Figure 5:
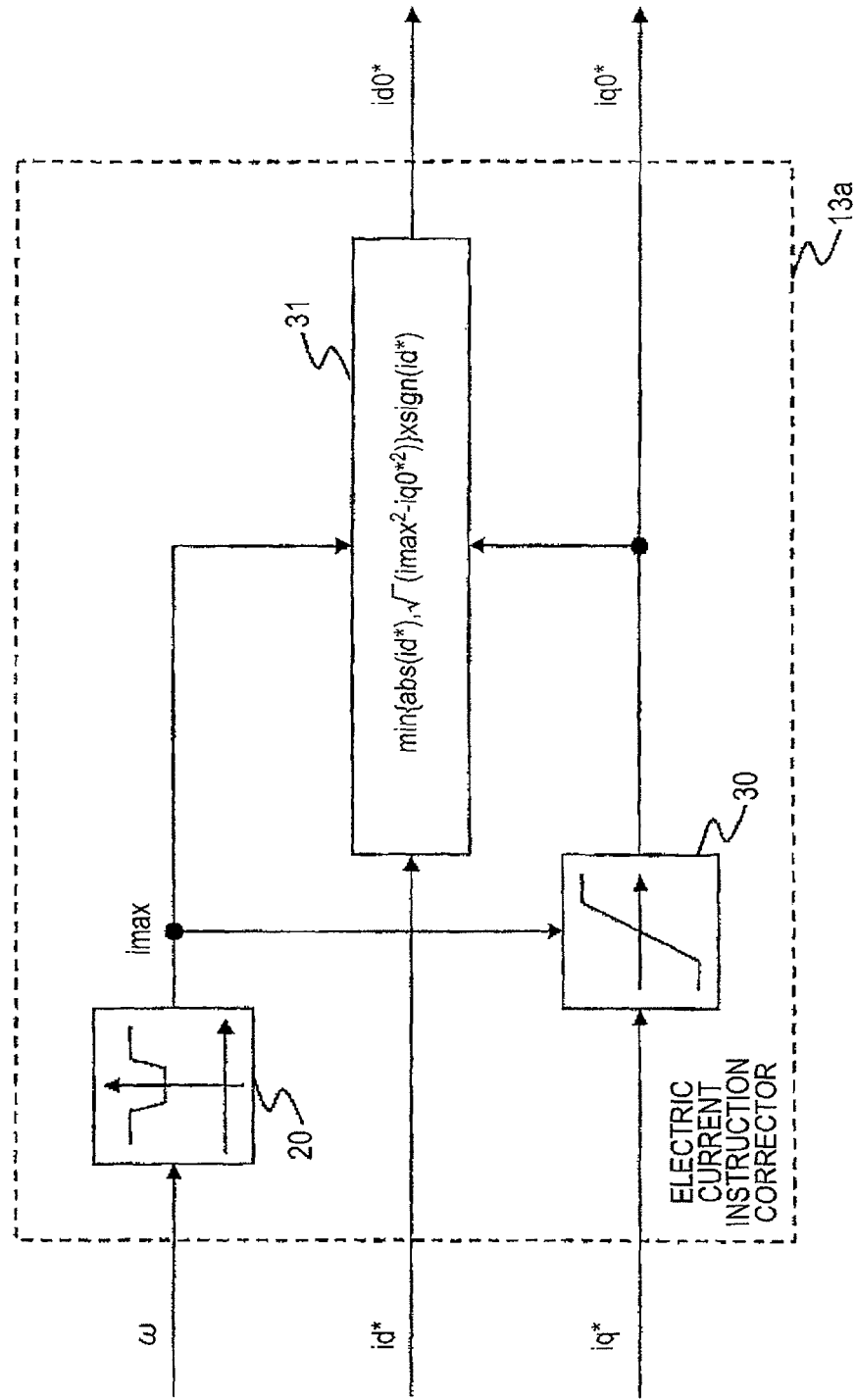
FIG. 5 is a diagram illustrating an internal configuration of an electric current instruction corrector according to a second embodiment of the present invention.

In the first embodiment, the electric current instruction corrector 13 has the configuration shown in FIG. 3, but may be replaced with an electric current instruction corrector 13a in which the magnetic flux component electric current instruction and the torque component electric current instruction are exchanged with each other. FIG. 5 is a diagram illustrating an internal configuration of the electric current instruction corrector 13a in a second embodiment. Here, like reference numerals are given to the same or equivalent elements as in the first embodiment.

A corrected torque component electric current instruction arithmetic unit 30 sets a corrected torque component electric current instruction iq0* to −imax in a case where a torque component electric current instruction iq* is smaller than −imax; sets the corrected torque component electric current instruction iq0* to imax in a case where the torque component electric current instruction iq* is larger than imax; and sets the corrected torque component electric current instruction iq0* to the torque component electric current instruction iq* in other cases. On the other hand, a corrected magnetic flux component electric current instruction arithmetic unit 31 calculates a corrected torque component electric current instruction id0* according to the following formula (2).

$$id0^* = \min\{abs(id^*), \sqrt{(imax^2 - iq0^{*2})}\} \times sign(id^*) \quad (2)$$

In the formula (2), the torque component and the magnetic flux component in the formula (1) are exchanged with each other. The formula (2) is the same as the formula (1) in that $\sqrt{(id0^{*2} + iq0^{*2})}$ corresponding to an instruction value of the electric current amplitude of the rotating AC machine can be allowed up to imax.

Even though the electric current instruction corrector 13a is configured as described above, if a rotation speed ω of the rotating AC machine 4 is increased, since the allowable electric current amplitude imax becomes large, the same effects as in the first embodiment can be achieved. That is, in a region where the rotational speed is low, the electric power supply capacity of a semiconductor power converter cannot be fully utilized. However, instead, even in a case where the "stationary steering" or "end contact" is continuously or repeatedly generated, the problem that the feeling is deteriorated can be solved or lessened.

Third Embodiment

Figure 6:
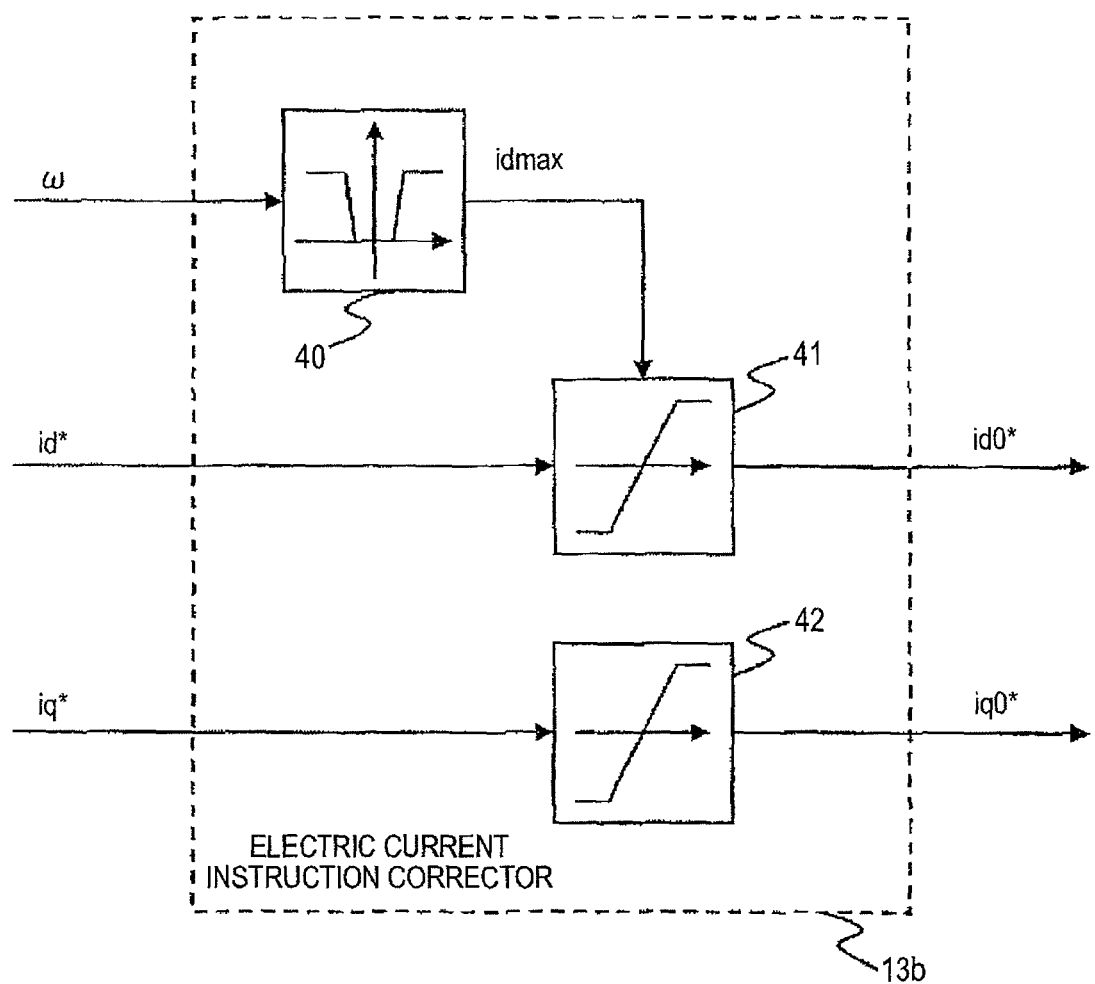
FIG. 6 is a diagram illustrating an internal configuration of an electric current instruction corrector according to a third embodiment of the present invention.

The electric current instruction corrector 13a according to the second embodiment may be replaced with an electric current instruction corrector 13b shown in FIG. 6. FIG. 6 is a diagram illustrating an internal configuration of the electric current instruction corrector 13b according to a third embodiment. Here, like reference numerals are given to the same or equivalent elements as in the first and second embodiments.

An allowable magnetic flux component electric current arithmetic unit 40 outputs an allowable magnetic flux component electric current amplitude idmax on the basis of a rotational speed ω. The allowable magnetic flux component electric current arithmetic unit 40 is configured so that if the rotational speed ω is increased, the allowable magnetic flux component electric current amplitude idmax becomes large, and if the rotational speed ω is lower than a predetermined value, the allowable magnetic flux component electric current amplitude idmax becomes zero.

A corrected magnetic flux component electric current instruction arithmetic unit 41 sets a corrected magnetic flux component electric current instruction id0* to −idmax in a case where a magnetic flux component electric current instruction id* is smaller than −idmax; sets the corrected magnetic flux component electric current instruction id0* to idmax in a case where the magnetic flux component electric current instruction id* is larger than idmax; and sets the corrected magnetic flux component electric current instruction id0* to the magnetic flux component electric current instruction id* in other cases.

In this embodiment, an allowable torque component electric current amplitude iqmax is given as a constant value regardless of the rotational speed ω. A value of the allowable torque component electric current amplitude iqmax is set to be smaller than the maximum electric current amplitude which can be supplied by the semiconductor power converter 5. More specifically, the allowable torque component electric current amplitude iqmax is set in the formula (3) so that the sum of the squares of a maximum value idmax2 of the allowable magnetic flux component electric current amplitude idmax changed according to the rotational speed ω and the allowable torque component electric current amplitude iqmax coincides with the square of the maximum electric current amplitude, that is, the allowable electric current amplitude imax which can be supplied by the semiconductor power converter 5.

$$Iq\max = \sqrt{(i\max^2 - id\max2^2)} \quad (3)$$

Since the allowable electric current amplitude imax and the maximum value idmax2 of the allowable magnetic flux component electric current amplitude are constant values, respectively, the allowable torque component electric current amplitude iqmax is also a constant value.

A corrected torque component electric current instruction arithmetic unit 42 sets a corrected torque component electric current instruction iq0* to −iqmax in a case where the torque component electric current instruction iq* is smaller than −iqmax; sets the corrected torque component electric current instruction iq0* to iqmax in a case where the torque component electric current instruction iq* is larger than iqmax; and sets the corrected torque component electric current instruction iq0* to the torque component electric current instruction iq* in other cases.

Further, the magnetic flux component electric current arithmetic unit 12 receives an input of the rotational speed ω, and is configured so that the magnetic flux component electric current instruction is set to zero in a case where the rotational speed is low, and the amplitude of the magnetic flux component electric current instruction becomes large if the rotational speed is increased. Further, if the allowable torque component electric current amplitude iqmax of the corrected torque component electric current instruction arithmetic unit 42 satisfies the formula (3), the functions of the allowable magnetic flux component electric current arithmetic unit 40 and the corrected magnetic flux component electric current instruction arithmetic unit 41 according to the present embodiment can be given to the magnetic flux component electric current arithmetic unit 12. In this case, the allowable magnetic flux component electric current arithmetic unit 40 and the corrected magnetic flux component electric current instruction arithmetic unit 41 may be omitted.

Even though the electric current instruction corrector 13b is configured as described above, if the rotational speed ω of the rotating AC machine 4 is increased, the allowable electric current amplitude can become large. In this case, even though the rotational speed ω is increased and the allowable electric current amplitude becomes large, the amplitude of the allowed torque component electric current is not changed. However, since the allowable torque component electric current amplitude iqmax has the constant value, the calculation of the electric current instruction corrector 13b can be simply performed.

Figure 7A:
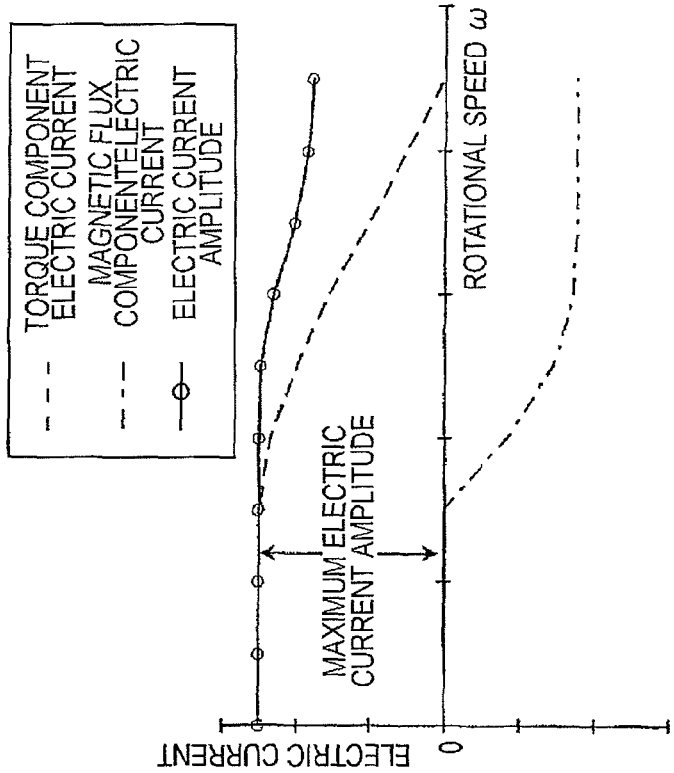
FIGS. 7A and 7B are diagrams illustrating a state where electric current amplitude allowed according to a rotational speed is changed.
Figure 7B:
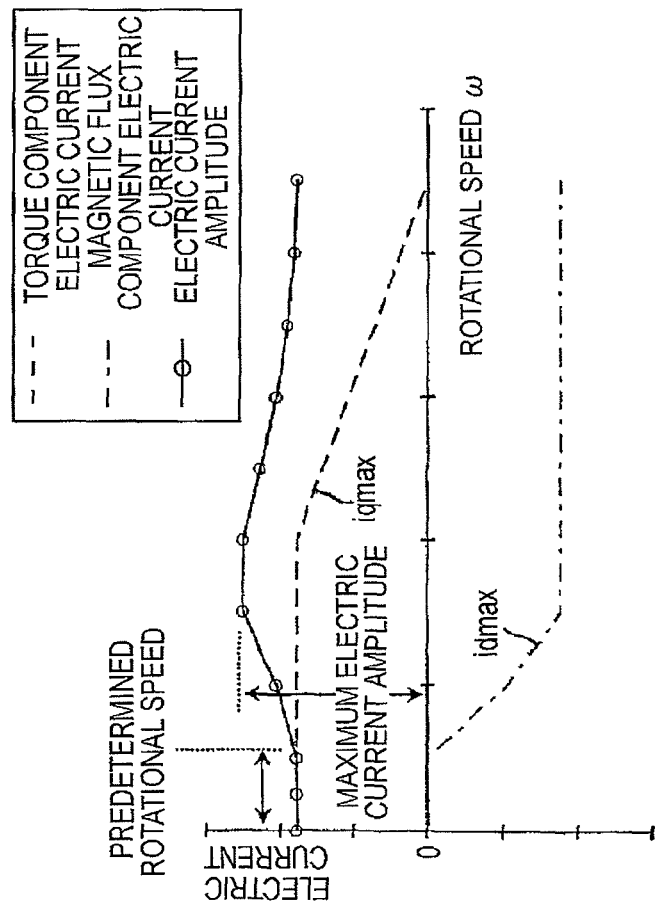

FIGS. 7A and 7B are diagrams illustrating a state where the allowed electric current amplitude is changed according to the rotational speed. Here, FIG. 7A illustrates the electric power steering apparatus according to the present embodiment. Since the allowable magnetic flux component electric current arithmetic unit 40 is configured so that the allowable magnetic flux component electric current amplitude idmax is set to zero if the rotational speed ω is lower than a predetermined value, the electric current amplitude which is allowed in a region where the rotational speed ω is lower than the predetermined value becomes the allowable torque component electric current amplitude iqmax.

Here, it is preferable that the predetermined rotational speed in which the allowable magnetic flux component electric current amplitude idmax is set to zero is a rotational speed in which the "stationary steering" or the "end contact" does not occur. For example, since a region where the "stationary steering" is generated is a region where the steering speed of the steering wheel 1 is about 100 to 300 deg/s at most, the predetermined rotational speed can be calculated by multiplying the steering speed by a gear ratio of a gear 8.

Further, the allowable magnetic flux component electric current arithmetic unit 40 is configured so that the allowable magnetic flux component electric current amplitude idmax becomes large if the rotational speed ω is increased, and the maximum value of the allowable magnetic flux component electric current amplitude idmax is idmax2. When the allowable magnetic flux component electric current amplitude is the maximum value idmax2, since the sum of the squares of idmax2 and iqmax coincides with the square of the allowable electric current amplitude imax, the allowed electric current amplitude reaches the allowable electric current amplitude imax if the rotational speed ω is increased. Further, the rotating AC machine which uses a permanent magnet in a rotor has an inductive voltage which becomes high as the rotational speed is increased. If the inductance voltage reaches a value around the voltage amplitude which can be applied by the semiconductor power converter, the torque component electric current cannot be supplied up to the allowable torque component electric current amplitude iqmax, and the torque component electric current is attenuated as the rotational speed is increased.

FIG. 7B illustrates the electric power steering apparatus in the related art. Here, in a case where the rotational speed ω is low, the maximum electric current which can be supplied by the semiconductor power converter is all allocated to the torque component electric current so that the semiconductor power converter is prevented from being unnecessarily used. Further, the rotating AC machine which uses the permanent magnet in the rotor has an inductive voltage which becomes high as the rotational speed is increased. The present embodiment is the same as in the electric power steering in the related art in that the torque component electric current cannot be supplied if the inductive voltage reaches a value around the voltage amplitude which can be applied by the semiconductor power converter and the torque component electric current is attenuated as the rotational speed is increased.

As understood by comparing FIG. 7A with FIG. 7B, the electric power steering in the present embodiment is configured so that the allowed electric current amplitude becomes large if the rotational speed ω is increased, and thus, the electric power supply capability of the semiconductor power converter cannot be fully utilized at the maximum level in a region where the rotational speed is low. However, instead, in a case where the "stationary steering" or the "end contact" is continuously generated, the problem that the feeling is deteriorated can be solved or lessened.

Fourth Embodiment

Figure 8:
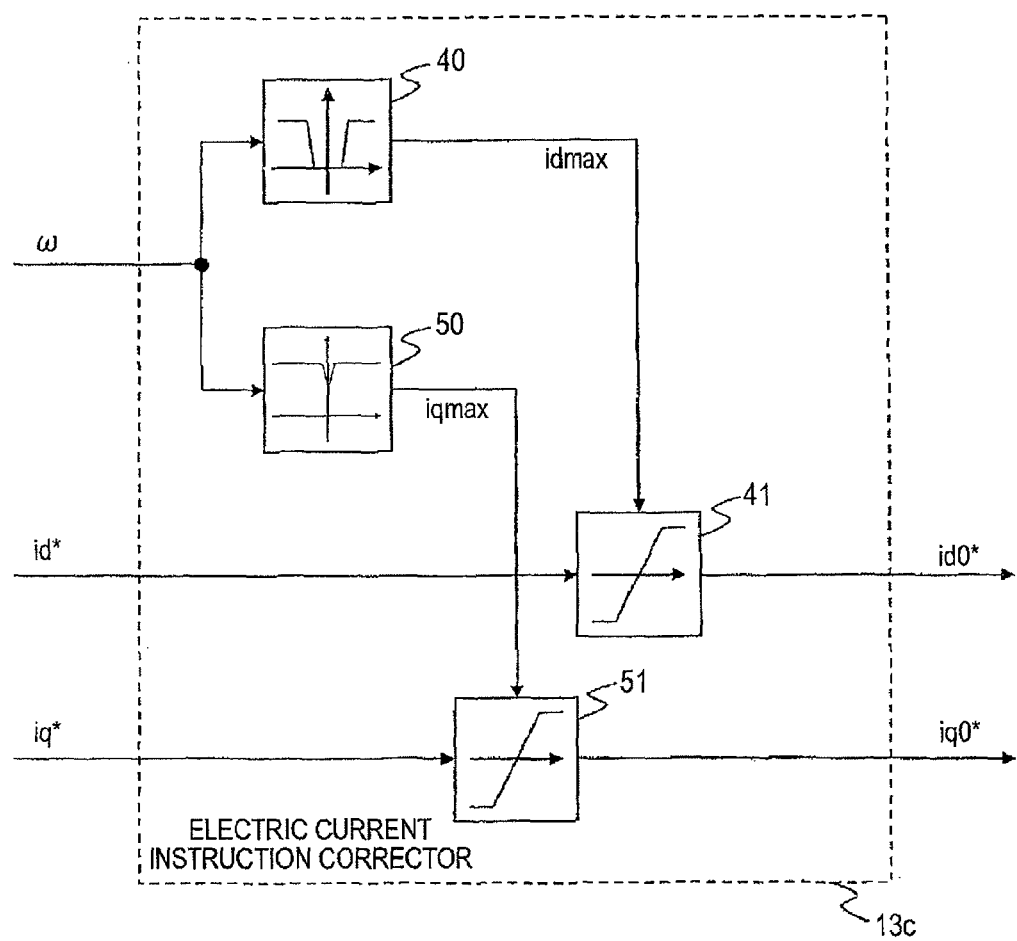
FIG. 8 is a diagram illustrating an internal configuration of an electric current instruction corrector according to a fourth embodiment of the present invention.

In the third embodiment, the allowable torque component electric current amplitude iqmax is given as the constant value, but since the "end contact" is generated when the rotational speed is zero, the allowable torque component electric current amplitude may be small around the rotational speed of zero. Thus, in this embodiment, the electric current instruction corrector 13b according to the third embodiment is replaced with an electric current instruction corrector 13c shown in FIG. 8. FIG. 8 is a diagram illustrating an internal configuration of the electric current instruction corrector 13c according to a fourth embodiment. Here, like reference numerals are given to the same or equivalent elements as in the above described embodiments.

An allowable torque component electric current arithmetic unit 50 outputs an allowable torque component electric current amplitude iqmax on the basis of the rotational speed ω. The allowable torque component electric current arithmetic unit 50 maintains the allowable torque component electric current amplitude iqmax as a constant value if the rotational speed ω is higher than a second predetermined value, and sets the allowable torque component electric current amplitude iqmax to become small if the rotational speed ω is lower than the second predetermined value. A corrected torque component electric current instruction arithmetic unit 51 sets a corrected torque component electric current instruction iq0* to −iqmax in a case where a torque component electric current instruction iq* is smaller than −iqmax; sets the corrected torque component electric current instruction iq0* to iqmax in a case where the torque component electric current instruction iq* is larger than iqmax; and sets the corrected torque component electric current instruction iq0* to the torque component electric current instruction iq* in other cases.

In this embodiment, a maximum value iqmax2 of the allowable torque component electric current amplitude iqmax output by the allowable torque component electric current arithmetic unit 50 is set to be smaller than the maximum electric current amplitude which can be supplied by the semiconductor power converter 5. That is, if the rotational speed $\omega$ is higher than the second predetermined value, the allowable torque component electric current arithmetic unit 50 outputs iqmax2 as the allowable torque component electric current amplitude. Further, the allowable torque component electric current amplitude iqmax2 is given according to the following formula (4) so that the sum of the squares of a maximum value idmax2 of the allowable magnetic flux component electric current amplitude idmax changed according to the rotational speed $\omega$ and the maximum value iqmax2 of the allowable torque component electric current amplitude Iqmax coincides with the square of the maximum electric current amplitude which can be supplied by the semiconductor power converter 5, that is, the allowable electric current amplitude imax.

$$Iq\text{max}2=\sqrt{(i\text{max}^2-id\text{max}2^2)} \qquad (4)$$

Figure 9:
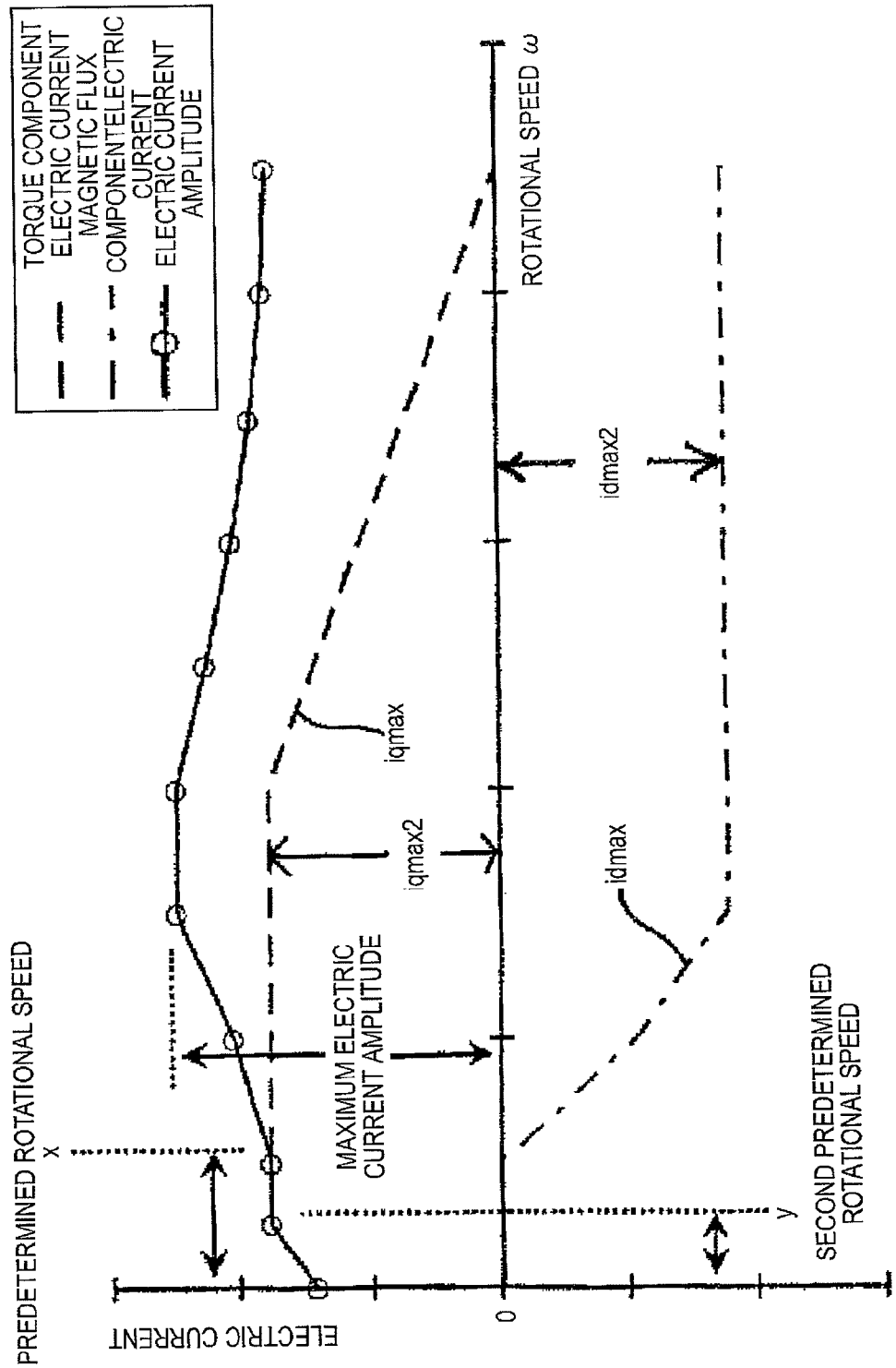
FIG. 9 is a diagram illustrating a state where electric current amplitude allowed according to a rotational speed is changed, in an electric power steering apparatus according to the fourth embodiment of the present invention.

FIG. 9 illustrates a state where the allowed electric current amplitude is changed according to the rotational speed, in the electric power steering apparatus according to the present embodiment. Since the allowable magnetic flux component electric current arithmetic unit 40 is configured so that the allowable magnetic flux component electric current amplitude idmax becomes zero if the rotational speed $\omega$ is lower than a first predetermined value x, in a region where the rotational speed $\omega$ is lower than the first predetermined rotational speed x, and in a region where the rotational speed $\omega$ is higher than a second predetermined rotational speed y, the allowed electric current amplitude becomes the allowable torque component electric current amplitude iqmax. Further, in a case where the rotational speed $\omega$ is lower than the second predetermined rotational speed y, in the allowable torque component electric current arithmetic unit 50, the allowable torque component electric current amplitude iqmax becomes smaller.

Here, it is preferable that the second predetermined rotational speed y in which the allowable torque component electric current amplitude iqmax becomes small is a rotational speed in which the "end contact" is not generated. For example, since a region where the "end contact" is generated is in a state where the steering speed of the steering wheel 1 is stopped, the second predetermined rotational speed y may be obtained by multiplying the steering speed of several tens of deg/s which is around zero by the gear rate of the gear 8.

Further, the allowable magnetic flux component electric current arithmetic unit 40 is configured so that the allowable magnetic flux component electric current amplitude idmax becomes large if the rotational speed $\omega$ is increased, and the allowable torque component electric current arithmetic unit 50 is configured so that the allowable torque component electric current amplitude iqmax becomes large if the rotational speed $\omega$ is increased. The maximum value of the allowable magnetic flux component electric current amplitude idmax is idmax2, and the maximum value of the allowable torque component electric current amplitude iqmax is iqmax2. When the allowable magnetic flux component electric current amplitude and the allowable torque component electric current amplitude are the maximum values, since the sum of the squares of idmax2 and iqmax2 coincides with the square of the allowable electric current amplitude imax, the allowed electric current amplitude reaches the allowable electric current amplitude imax if the rotational speed $\omega$ is increased.

Further, the present embodiment is the same as in FIG. 6 in that the rotating AC machine which uses the permanent magnet in the rotor has an inductive voltage which becomes high as the rotational speed is increased, the torque component electric current cannot be supplied up to the allowable torque component electric current amplitude iqmax2 if the inductive voltage reaches a value around the voltage amplitude which can be applied by the semiconductor power converter, and the torque component electric current is attenuated as the rotational speed is increased.

Fifth Embodiment

Since the electric power steering apparatus in the present embodiment is configured so that the allowable electric current amplitude becomes small if the rotational speed is low, an auxiliary torque which can be generated becomes small if the same rotating AC machine as in the electric power steering apparatus in the related art is used.

Since the torque which can be generated by the rotating AC machine is proportional to a product of a magnetic flux of the rotor $\phi$ and the allowable torque component electric current amplitude iqmax, the magnetic flux of the rotor $\phi$ of the rotating AC machine may set to become larger than the electric power steering apparatus in the related art, to the extent that the allowable torque component electric current amplitude iqmax is smaller than the electric power steering apparatus in the related art. That is, the magnetic flux of the rotor $\phi$ of the rotating AC machine may be given to be inversely proportional to the extent that the allowable torque component electric current amplitude becomes small compared with the electric power steering apparatus in the related art.

FIGS. 10A and 10B are diagrams illustrating the allowed electric current amplitude and the maximum torque which can be generated by the rotating AC machine. An upper area in FIG. 10A illustrates the electric current amplitude allowed by the electric power steering apparatus according to the present embodiment. Since the allowable magnetic flux component electric current arithmetic unit 40 is configured so that the allowable magnetic flux component electric current amplitude idmax becomes zero if the rotational speed $\omega$ is lower than the predetermined value x, the electric current amplitude allowed in a region where the rotational speed $\omega$ is lower than the predetermined value becomes the allowable torque component electric current amplitude iqmax, which is the same as in FIGS. 7A and 7B according to the third embodiment.

In this embodiment, the magnetic flux of the rotor of the rotating AC machine is set to be larger than the electric power steering apparatus in the related art. As a result, even though the electric current amplitude allowed in a case where the rotational speed is low becomes small, the torque equivalent to the electric power steering apparatus in the related art can be obtained. A lower area in FIG. 10A illustrates the maximum torque which can be generated by the rotating AC machine of the electric power steering apparatus according to the present embodiment. In the figure, a dashed line illustrates a case where the magnetic flux of the rotor is the same as in the rotating AC machine of the electric power steering apparatus in the related art disclosed in FIG. 10B, and a solid line illustrates a case where the magnetic flux of the rotor becomes large to the extent that the allowable torque component electric current amplitude is small compared with the rotating AC machine of the electric power steering apparatus in the related art.

As understood through the solid line in the lower area in FIG. 10A, the torque becomes large to the extent that the magnetic flux of the rotor is large, even though the allowable torque component electric current amplitude is small compared with the apparatus in the related art. On the other hand, if the magnetic flux of the rotor becomes larger than the electric power steering apparatus in the related art, since the inductive voltage becomes large, it is necessary to enlarge the amplitude of the magnetic flux component electric current for canceling the magnetic flux of the rotor, compared with the electric power steering apparatus in the related art. Further, as shown in FIG. 10A, as the rotational speed is increased, the magnetic flux component electric current becomes large.

Further, since the rotational speed in which the magnetic flux component electric current for canceling the magnetic flux of the rotor is required is a rotational speed in which the "stationary steering" or the "end contact" is not generated, a large amount of electric current is rarely continuously or repeatedly generated, and even though the electric current amplitude allowed in a case where the rotational speed is high becomes large, the problem of the heat generation of the semiconductor power converter, for example, due to the "stationary steering" or the "end contact" does not occur.

FIG. 10B illustrates the case of the electric power steering apparatus in the related art. Here, the allowed electric current amplitude and the maximum torque which can be generated are the same as in FIG. 10A. However, since the allowed electric current amplitude is the same irrespective of the magnitude of the rotational speed, the allowed electric current amplitude is not changed even at a low rotational speed in which the "stationary steering" or the "end contact" is generated, and the feeling is deteriorated if the "stationary steering" or the "end contact" is continuously generated.

As described above, if the magnetic flux of the rotor of the rotating AC machine is set to be larger than the electric power steering apparatus in the related art, the problem that the feeling is deteriorated in a case where the "stationary steering" or the "end contact" is continuously generated can be solved or lessened, and also, the auxiliary torque can be generated in the "stationary steering" or the "end contact" at an equivalent level to the electric power steering apparatus in the related art.

Various modifications and alterations of this invention will be apparent to those skilled in the art without departing from the scope and spirit of this invention, and it should be understood that this is not limited to the illustrative embodiments set forth herein.

What is claimed is:

1. An electric power steering apparatus comprising:
   an rotating AC machine which generates an auxiliary torque for assisting a steering torque of a steering system;
   a torque detector which detects the steering torque; and
   a controller which calculates a voltage instruction to a semiconductor power converter which controls the rotating AC machine using a magnetic flux component electric current instruction and a torque component electric current instruction generated based on the detected torque by the torque detector,
   wherein said controller comprises an electric current instruction corrector to control an electric current amplitude allowed by the rotating AC machine to become large if a rotational speed of the rotating AC machine is increased, and to control the electric current amplitude allowed by the rotating AC machine to become small if the rotational speed of the rotating AC machine is decreased.

2. The electric power steering apparatus according to claim 1, wherein the electric current instruction corrector is configured to output both the input of a magnetic flux component electric current instruction and the torque component electric current instruction as they are if the relationship between both the instructions is within an allowable range of the electric current amplitude which is supplied to the rotating AC machine, and to correct at least one of both the instructions so that the relationship between both the instructions comes within the allowable range if the relationship between both the instructions is beyond the allowable range of the electric current amplitude.

3. The electric power steering apparatus according to claim 2, wherein the electric current instruction corrector decomposes electric current of the rotating AC machine into a magnetic flux component electric current and a torque component electric current, independently controls the magnetic flux component electric current and the torque component electric current, and performs control so that the amplitude of the allowed torque component electric current is constantly maintained and the amplitude of the magnetic flux component electric current becomes large if the rotational speed of the rotating AC machine is increased.

4. The electric power steering apparatus according to claim 2, wherein the electric current instruction corrector decomposes electric current of the rotating AC machine into a magnetic flux component electric current and a torque component electric current, independently controls the magnetic flux component electric current and the torque component electric current, and performs control so that the amplitude of the allowed magnetic flux component electric current is constantly maintained and the amplitude of the torque component electric current becomes large if the rotational speed of the rotating AC machine is increased.

5. The electric power steering apparatus according to claim 2, wherein the electric current instruction corrector decomposes electric current of the rotating AC machine into a magnetic flux component electric current and a torque component electric current, independently controls the magnetic flux component electric current and the torque component electric current, and performs control so that the amplitude of the torque component electric current and the amplitude of the magnetic flux component electric current become large if the rotational speed of the rotating AC machine is increased.

6. The electric power steering apparatus according to claim 2, wherein the electric current instruction corrector decomposes electric current of the rotating AC machine into a magnetic flux component electric current and a torque component electric current, independently controls the magnetic flux component electric current and the torque component electric current, and performs control so that the amplitude of the magnetic flux component electric current becomes large if the rotational speed of the rotating AC machine is increased and the amplitude of the allowed torque component electric current becomes small if the rotational speed becomes lower than a predetermined value.

7. The electric power steering apparatus according to claims 2, wherein the electric current instruction corrector generates a corrected magnetic flux component electric current instruction and a corrected torque component electric current instruction on the basis of the torque component electric current instruction generated on the basis of the steering torque, the magnetic flux component electric current instruction generated on the basis of the rotational speed of the rotating AC machine, and the rotational speed of the rotating AC machine, and applies voltage for enabling the magnetic flux component electric current and the torque component electric current to respectively coincide with the corrected magnetic flux component electric current instruction and the corrected torque component electric current instruction to the rotating AC machine, and wherein the corrected magnetic flux component electric current instruction and the corrected torque component electric current instruction are corrected so that the sum of the squares of the magnetic flux component electric current instruction and the torque component electric current instruction does not exceed the square of the allowed electric current amplitude to generate the magnetic flux component electric current instruction and the torque component electric current instruction.

8. The electric power steering apparatus according to claim 6, wherein the magnetic flux of a rotor of the rotating AC machine becomes large to the extent that the amplitude of the allowed torque component electric current is decreased.

* * * * *